(12) United States Patent
Kojima et al.

(10) Patent No.: US 12,365,372 B2
(45) Date of Patent: Jul. 22, 2025

(54) TRAIN MONITORING DEVICE, GENERATION DEVICE, AND EVENT DETECTION DEFINITION GENERATION METHOD

(71) Applicant: Mitsubishi Electric Corporation, Tokyo (JP)

(72) Inventors: Taizo Kojima, Tokyo (JP); Akira Sugimoto, Tokyo (JP); Eisho Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 902 days.

(21) Appl. No.: 17/299,337

(22) PCT Filed: Dec. 13, 2018

(86) PCT No.: PCT/JP2018/045916
§ 371 (c)(1),
(2) Date: Jun. 3, 2021

(87) PCT Pub. No.: WO2020/121490
PCT Pub. Date: Jun. 18, 2020

(65) Prior Publication Data
US 2022/0017128 A1 Jan. 20, 2022

(51) Int. Cl.
*B61L 15/00* (2006.01)
*B60L 3/00* (2019.01)
(Continued)

(52) U.S. Cl.
CPC ......... *B61L 15/0081* (2013.01); *B60L 3/0023* (2013.01); *B61L 15/0018* (2013.01);
(Continued)

(58) Field of Classification Search
CPC ............... B61L 15/0081; B61L 25/025; B61L 15/0018; B60L 3/0023; B60L 3/0038;
(Continued)

(56) References Cited

U.S. PATENT DOCUMENTS 5,579,013 A * 11/1996 Hershey ................. G01S 5/0027
342/357.4
6,434,452 B1 * 8/2002 Gray ..................... B61L 25/021
701/19
(Continued)

FOREIGN PATENT DOCUMENTS

EP 3264061 A1 * 1/2018 ............ B60L 3/0038
JP H10-40086 A 2/1998
(Continued)

OTHER PUBLICATIONS

Office Action issued on Mar. 29, 2022, by the Indian Patent Office in corresponding Indian Patent Application No. 202127024917. (5 pages).

*Primary Examiner* — S. Joseph Morano
*Assistant Examiner* — Cheng X Lin
(74) *Attorney, Agent, or Firm* — BUCHANAN, INGERSOLL & ROONEY PC

(57) ABSTRACT

A train monitoring device includes an obtaining unit to obtain device status information, a monitoring unit including an event detection definition, and an event detection program to interpret the event detection definition and check whether an event has occurred. When the event detection program monitors the status of the device, a first program included in the event detection program interprets and executes an intermediate language representation included in the event detection definition, and a second program included in the event detection program determines whether an event has occurred by using area information and storage information about a memory having stored therein a value (Continued)

that indicates whether an event has occurred, the area information and the storage information being included in the event detection definition. An output unit outputs an alarm indicating that the device is an anomalous status when the monitoring unit detects an anomaly in the device.

8 Claims, 9 Drawing Sheets

(51) Int. Cl.
*G07C 5/08* (2006.01)
*H04L 67/12* (2022.01)

(52) U.S. Cl.
CPC ......... *G07C 5/0808* (2013.01); *G07C 5/0833* (2013.01); *B60L 2200/26* (2013.01); *H04L 67/12* (2013.01)

(58) Field of Classification Search
CPC .............. B60L 2200/26; G07C 5/0808; G07C 5/0833; H04L 67/12
See application file for complete search history.

(56) References Cited

U.S. PATENT DOCUMENTS

| | | | |
|---|---|---|---|
| 10,730,536 B2* | 8/2020 | Ahuja | ................. B61L 15/0072 |
| 2016/0009303 A1* | 1/2016 | Spahis | .................... B61L 27/40 |
| | | | 701/19 |
| 2019/0248396 A1* | 8/2019 | Khosla | .................... B61L 27/04 |

FOREIGN PATENT DOCUMENTS

| | | | |
|---|---|---|---|
| JP | 2007-110888 A | | 4/2007 |
| JP | 2012205332 A | * | 10/2012 |
| JP | 2017502639 A | * | 1/2017 |

* cited by examiner

| VEHICLE TYPE | DEVICE | NUMBER OF DEVICES |
|---|---|---|
| A | DCU | 2 |

201

| CAR NUMBER | VEHICLE TYPE |
|---|---|
| 1 | A |
| 2 | A |

| DEVICE TYPE | EVENT NUMBER | FILTER | | CONDITIONAL EXPRESSION | DEFINITION LEVEL |
| --- | --- | --- | --- | --- | --- |
| | | CAR NUMBER | DEVICE NUMBER | | |
| DCU | 1 | * | * | SIMPLE CONDITIONAL EXPRESSION 1 | DEVICE |
| DCU | 2 | 1 | | COMPLEX CONDITIONAL EXPRESSION 1 | VEHICLE |
| DCU | 2 | 2 | | COMPLEX CONDITIONAL EXPRESSION 2 | VEHICLE |
| DCU | 3 | | | COMPLEX CONDITIONAL EXPRESSION 3 | FORMATION |

| DEVICE TYPE | EVENT NUMBER | BIT POSITION | BIT WIDTH |
|---|---|---|---|
| DCU | 1 | 96 | 1 |

TRAIN MONITORING DEVICE, GENERATION DEVICE, AND EVENT DETECTION DEFINITION GENERATION METHOD

FIELD

The present invention relates to a train monitoring device that monitors the status of a device installed in a train, and relates to a generation device and an event detection definition generation method.

BACKGROUND

There is conventionally a monitoring device that obtains, from various types of devices installed in a train, a signal indicating the status of each device, and determines whether the device or its operation is anomalous on the basis of the obtained signal. The monitoring device issues an alarm when determining that the device or its operation is anomalous. Such a technique as described above is disclosed in Patent Literature 1.

CITATION LIST

Patent Literature

Patent Literature 1: Japanese Patent Application Laid-open No. 2012-205332

SUMMARY

Technical Problem

A monitoring device monitors many types of devices, and also monitors devices of the same type that are present across a plurality of vehicles. As trains have become more advanced, the number of types of devices to be monitored has increased, and accordingly the monitoring device has an increased number of functions. This complicates a program to be executed for monitoring, and increases the program size. As a result, there is a problem that maintainability of the monitoring device is degraded.

The present invention has been achieved to solve the above problems, and an object of the present invention is to provide a train monitoring device that monitors the status of a device installed in a train and that makes it possible to improve maintainability of the train monitoring device.

Solution to Problem

In order to solve the above problems and achieve the object, a train monitoring device according to the present invention monitors a status of a device installed in a train. The train monitoring device includes: an obtaining unit to obtain, from the device, device status information indicating a status of a device; a monitoring unit including an event detection definition, and an event detection program to interpret the event detection definition and check whether an event has occurred, the event detection definition being generated by using a device location definition in which a location of the device in the train is defined, a vehicle configuration definition in which formation of the train is defined, and a detection definition template in which a condition indicating that the device is in an anomalous status is defined, where when the event detection program monitors a status of the device on a basis of the device status information, a first program included in the event detection program interprets and executes an intermediate language representation included in the event detection definition, and a second program included in the event detection program determines whether an event has occurred by using area information and storage information about a memory having stored therein a value that indicates whether an event has occurred, the area information and the storage information being included in the event detection definition; and an output unit to output an alarm indicating that the device is an anomalous status when the monitoring unit detects an anomaly in the device.

Advantageous Effects of Invention

The present invention has an effect where it is possible to improve maintainability of a train monitoring device.

BRIEF DESCRIPTION OF DRAWINGS

FIG. 6 is a diagram illustrating an example of a detection definition template obtained by the obtaining unit in the generation device.

DESCRIPTION OF EMBODIMENTS

A train monitoring device, a generation device, and an event detection definition generation method according to embodiments of the present invention will be described in detail below with reference to the accompanying drawings. The present invention is not limited to the embodiments.

Embodiment

Figure 1:
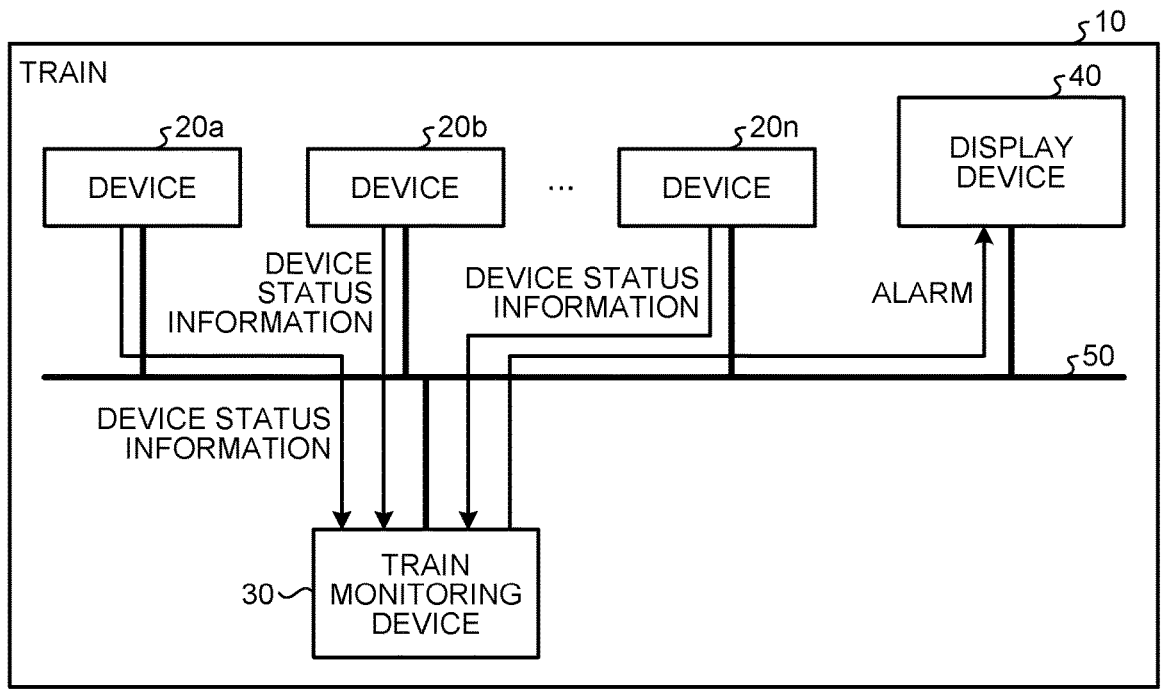
FIG. 1 is a diagram illustrating a configuration example of a train monitoring device, devices, and a display device installed in a train.

FIG. 1 is a diagram illustrating a configuration example of a train monitoring device 30 according to an embodiment of the present invention and installed in a train 10, devices 20a, 20b, . . . , and 20n to be monitored, and a display device 40 to display a result of the monitoring by the train monitoring device 30. The train 10 includes the devices 20a, 20b, . . . , and 20n, the train monitoring device 30, the display device 40, and a communication network 50.

The train 10 is a target train for the train monitoring device 30 to monitor the status of each of the devices 20a, 20b, . . . , and 20n. It is allowable that the train 10 is constituted by a plurality of vehicles, or may cover a case where the train 10 is a single-vehicle train.

The devices 20a, 20b, . . . , and 20n are installed in the train 10 and are, for example, a DCU (Door Control Unit) and a CU (Control Unit). The train 10 has a plurality of devices of the same type installed therein. The devices 20a, 20b, . . . , and 20n, when not distinguished from each other, are sometimes referred collectively to as "device 20". While in FIG. 1, the train 10 has n devices 20 installed therein merely as an example, the number of devices 20 installed in the train 10 is not limited to n.

The train monitoring device 30 monitors the status of the device 20 installed in the train 10. Specifically, the train monitoring device 30 obtains, from each device 20, device status information indicating the status of the device 20, and monitors the status of the device 20 on the basis of the obtained device status information. The device status information includes different details depending on the type of the device 20. The device status information may also include information on a plurality of attributes indicating the status of the device 20, that is, include attribute values. For example, in a case where the device 20 is a DCU, the device status information includes information indicating whether the doors are opened or closed, and the attribute value can be represented by 1-bit of information, "0" or "1". In a case where the device 20 is a device that includes a motor, the device status information includes information on the basis of a rotational speed of the motor. In a case where the device 20 is a device that generates heat, it is allowable that the device status information includes information on a temperature detected by a temperature sensor incorporated in the device 20 or installed outside the device 20. The attribute value is not limited to 1-bit of information, "0" or "1", but may be information representing a numerical value, a character string, or other types of data. When the train monitoring device 30 detects an anomaly in the device 20, the train monitoring device 30 outputs an alarm indicating the anomaly in the device 20.

The display device 40 displays an alarm or the like indicating an anomaly in the device 20 detected by the train monitoring device 30. It is allowable that the train 10 includes a device to output an alarm sound in place of the display device 40, or includes a device to output an alarm sound along with the display device 40.

The communication network 50 is installed in the train 10 and is, for example, a LAN (Local Area Network).

The train monitoring device 30 monitors the status of the device 20 by executing an event detection program that runs by loading an event detection definition. The event detection definition is data describing a condition for determining whether the device 20 is in an anomalous status.

Figure 2:
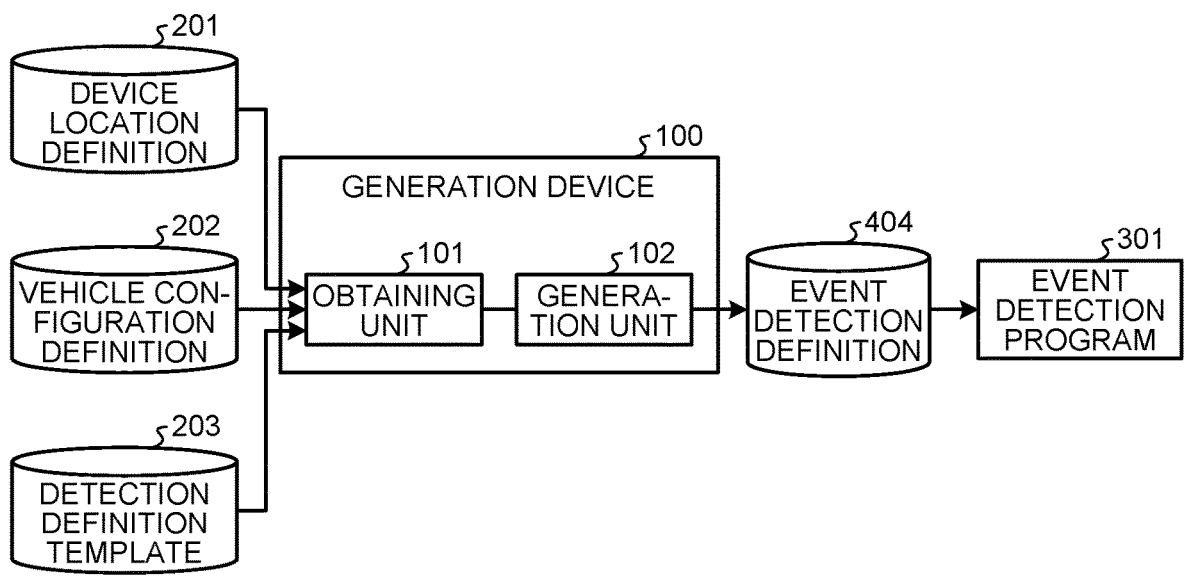
FIG. 2 is a block diagram illustrating a configuration example of a generation device.

Descriptions are made on the configuration and the operation of a generation device that generates an event detection definition. The event detection definition is loaded as data into an event detection program to be executed by the train monitoring device 30. FIG. 2 is a block diagram illustrating a configuration example of a generation device 100 according to the present embodiment. The generation device 100 includes an obtaining unit 101 and a generation unit 102.

The obtaining unit 101 obtains a device location definition 201 in which the location of the device 20 in the train 10 is defined, a vehicle configuration definition 202 in which formation of the train 10 is defined, and a detection definition template 203 in which a condition, indicating that the device 20 is in an anomalous status or in a status in which an alarm needs to be output, is defined.

The generation unit 102 uses the device location definition 201, the vehicle configuration definition 202, and the detection definition template 203 to generate an event detection definition 404 to be executed by the train monitoring device 30 for monitoring the status of the device 20 installed in the train 10.

In the train monitoring device 30, an event detection program 301 runs by loading data that is the event detection definition 404. Information on the train configuration and installed devices, and specific processing details for an event detection are not directly embedded in the event detection program 301 itself. The event detection program 301 is designed to read such data as described above from outside of the program to perform processing. In a case where there is a change in the train configuration or where the installed devices are changed, or in a case where a change is made in the detection process, the event detection definition 404 is replaced corresponding to the change. The generation device 100 generates the event detection definition 404.

Descriptions are made on a process of generating the event detection program 301 by the generation device 100 using the device location definition 201, the vehicle configuration definition 202, and the detection definition template 203. First, the device location definition 201, the vehicle configuration definition 202, and the detection definition template 203, which are obtained by the generation device 100, are described.

Figures 3, 4, 5:
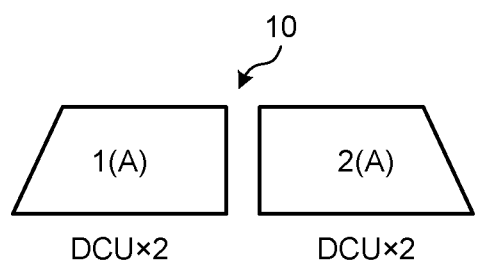
FIG. 3 is a diagram illustrating an example of a device location definition obtained by an obtaining unit in the generation device.
FIG. 4 is a diagram illustrating an example of a vehicle configuration definition obtained by the obtaining unit in the generation device.
FIG. 5 is a diagram illustrating a configuration example of a train obtained from the device location definition and the vehicle configuration definition.

FIG. 3 is a diagram illustrating an example of the device location definition 201 obtained by the obtaining unit 101 in the generation device 100 according to the present embodiment. The device location definition 201 shows a device installed in each type of vehicle constituting the train 10, and shows the number of devices installed in the vehicle. In an example of the device location definition 201 illustrated in FIG. 3, two DCUs are installed in a vehicle of type A.

FIG. 4 is a diagram illustrating an example of the vehicle configuration definition 202 obtained by the obtaining unit 101 in the generation device 100 according to the present embodiment. The vehicle configuration definition 202 shows the formation of the train 10, that is, the arrangement of the vehicles constituting the train 10. In an example of the vehicle configuration definition 202 illustrated in FIG. 4, the train 10 is of a two-vehicle formation in which the vehicle of a first car is a vehicle of type A and the vehicle of a second car is a vehicle of type A.

The configuration of the train 10 obtained from the device location definition 201 illustrated in FIG. 3 and the vehicle configuration definition 202 illustrated in FIG. 4 is described below. FIG. 5 is a diagram illustrating a configuration example of the train 10 obtained from the device location definition 201 and the vehicle configuration definition 202 according to the present embodiment. In the example of the train 10 illustrated in FIG. 5, the first car is a vehicle of type A and has two DCUs installed therein as the device 20, while the second car is a vehicle of type A and has two DCUs installed therein as the device 20. That is, FIG. 5 shows that the train 10 has four DCUs installed therein as the device 20.

FIG. 6 is a diagram illustrating an example of the detection definition template 203 obtained by the obtaining unit 101 in the generation device 100 according to the present embodiment. A condition for detecting an anomaly in the device 20 during monitoring performed on the device 20 is defined in the detection definition template 203. In FIG. 6, "DEVICE TYPE" indicates the type of the device 20 to be monitored. "EVENT NUMBER" indicates the type of an event in each device 20. Each event indicates monitoring details for detecting an anomaly in the device 20, that is, indicates an event having occurred in the device 20. "FILTER" is an item to specify the object affected by the event indicated by the event number. In this example, "CAR NUMBER" and "DEVICE NUMBER" are set in the item "FILTER". The car number indicates a number assigned to a vehicle installed with the device 20 to be monitored in the train 10. The device number indicates a number assigned to the device 20 for identifying the device 20 to be monitored. "CONDITIONAL EXPRESSION" indicates a condition that specifies the status in which a device is detected as anomalous. "DEFINITION LEVEL" indicates the object affected by the event indicated by the event number. FIG. 6 shows that the object affected by the event is the device 20, a vehicle constituting the train 10, or the formation of the train 10. In addition to these items, it is allowable to include an item "LOGICAL INFORMATION" that represents whether each event is positive logic or negative logic.

In FIG. 6, the conditional expression indicated by an event number 1 is a monomial and means a simple conditional expression in which a detection condition is satisfied by determining whether the attribute value is true or false for a determination value. This conditional expression indicated by the event number 1 is a simple conditional expression 1 illustrated in FIG. 6. The simple conditional expression includes a conditional expression that may become a monomial when the conditional expression is expanded. The symbol "*" appearing in "CAR NUMBER" and "DEVICE NUMBER" in FIG. 6 means being applicable to all. In FIG. 6, a conditional expressions indicated by an event number 2 and the event number 3 mean a complex conditional expression made up of a conditional expression other than the simple conditional expression, that is, made up of a conditional expression that cannot be represented by a simple conditional expression. These conditional expressions indicated by the event number 2 and the event number 3 are complex conditional expressions 1 to 3 illustrated in FIG. 6. Examples of the complex conditional expressions include a conditional expression made up of an AND function, an IF statement, or a FOR statement.

Figure 7:
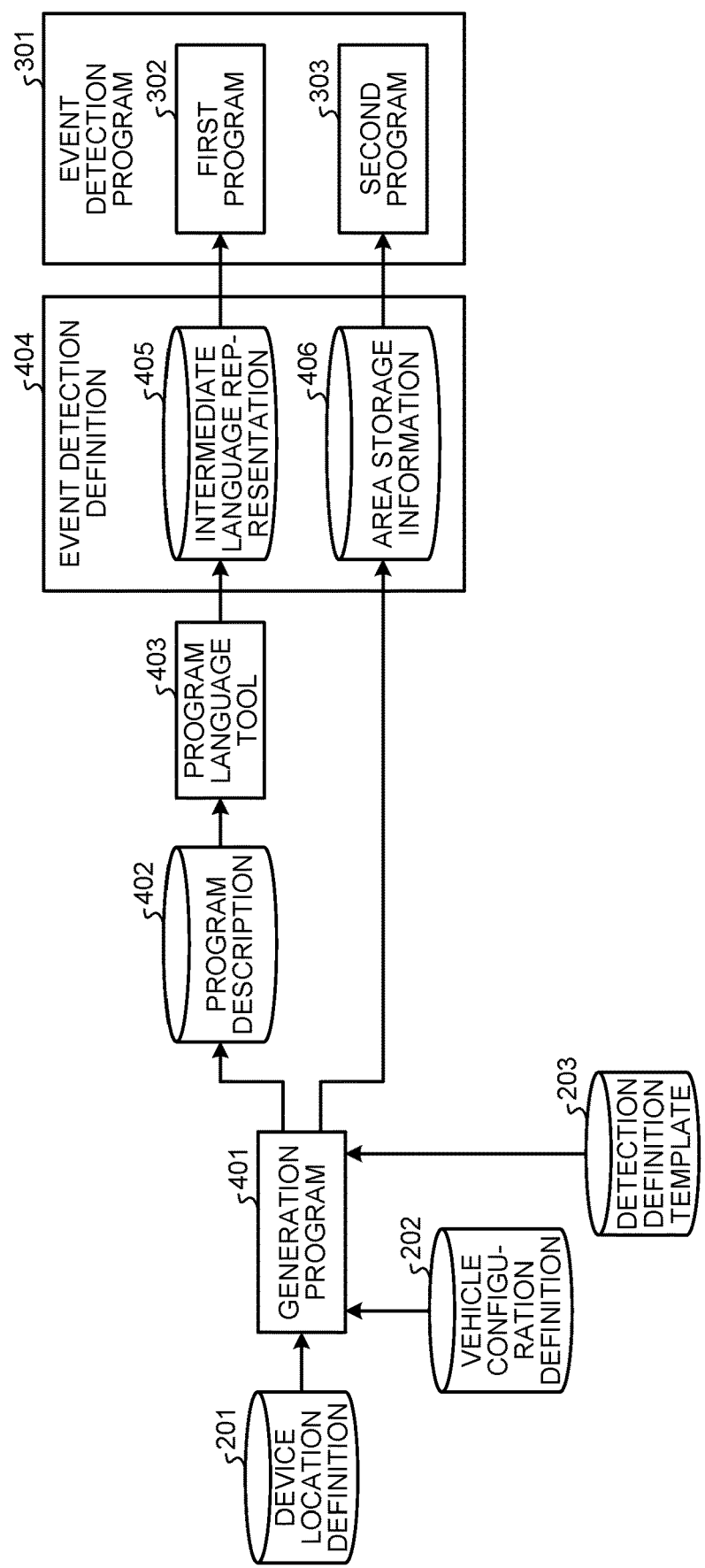
FIG. 7 is a diagram illustrating the outline of a process of generating an event detection definition by a generation unit in the generation device by using the device location definition, the vehicle configuration definition, and the detection definition template.

FIG. 7 is a diagram illustrating the outline of the process of generating the event detection definition 404 by the generation unit 102 in the generation device 100 according to the present embodiment by using the device location definition 201, the vehicle configuration definition 202, and the detection definition template 203. The generation unit 102 executes a generation program 401 to generate the event detection definition 404, and obtains data from the device location definition 201, the vehicle configuration definition 202, and the detection definition template 203 to separately generate a program description 402 and area storage information 406. The generation unit 102 uses a program language tool 403 such as a compiler or a linker to generate an intermediate language representation 405 from the program description 402.

Two programs are incorporated in the event detection program 301 to be executed by the train monitoring device 30. A first program 302 is an intermediate-language interpretive-execution module. A second program 303 is an arithmetic module. The intermediate-language interpretive-execution module is a program to read, interpret, and execute data that is the intermediate language representation 405. The arithmetic module is a program to read area information such as a memory address and a memory size, and storage information such as a 4-byte integer or a 1-byte integer, described in the area storage information 406, then to obtain a value in the memory by using the read area information and storage information, and to detect occurrence of an event on the basis of the obtained value.

Figure 8:
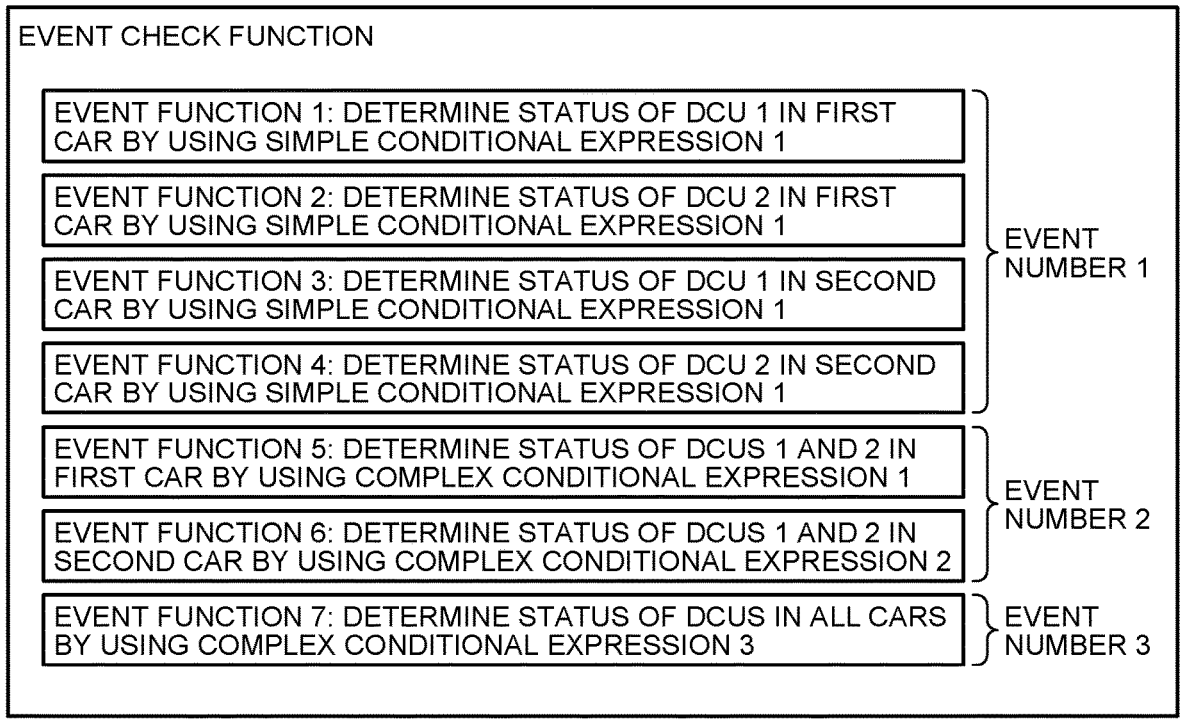
FIG. 8 is a diagram illustrating an example in a case where the generation unit in the generation device generates all the event detection definitions obtained from the device location definition, the vehicle configuration definition, and the detection definition template in the form of intermediate language representation.

An example of the event detection definition 404 in a case where data of the event detection definition 404 is all generated in the form of the intermediate language representation 405 is illustrated in FIG. 8. FIG. 8 is a diagram illustrating an example of the event detection definition 404 in a case where the generation unit 102 in the generation device 100 according to the present embodiment generates all the event detection definitions 404, obtained from the device location definition 201, the vehicle configuration definition 202, and the detection definition template 203, in the form of the intermediate language representation 405. As illustrated in FIG. 8, event detection determination for DCUs is conducted by executing an event check function. The event check function is expanded into seven event functions corresponding to the detection definition template 203. In FIG. 8, four event functions are generated for the event number 1, two event functions are generated for the event number 2, and one event function is generated for the event number 3.

Figure 9:
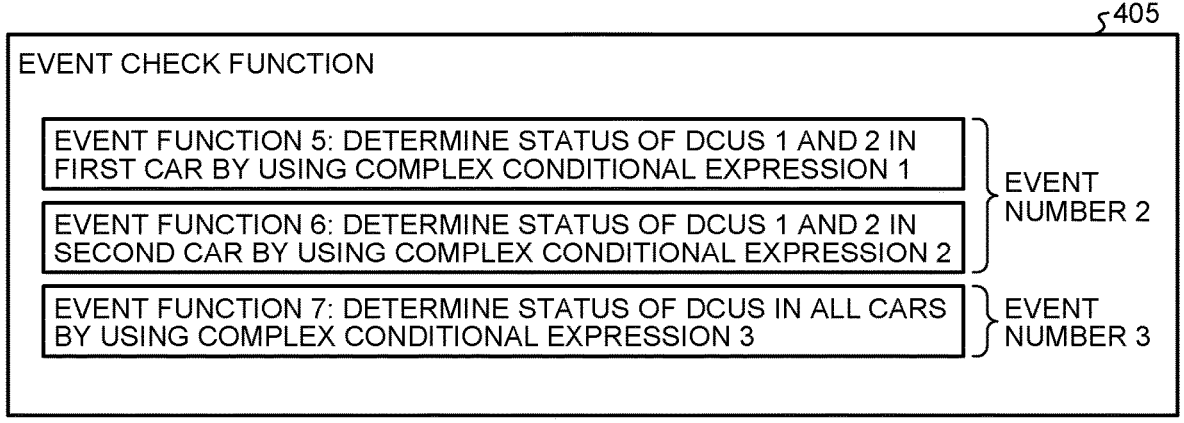
FIG. 9 is a diagram illustrating an example of the intermediate language representation in the event detection definition generated by the generation unit in the generation device by using the device location definition, the vehicle configuration definition, and the detection definition template.
Figures 10, 11:
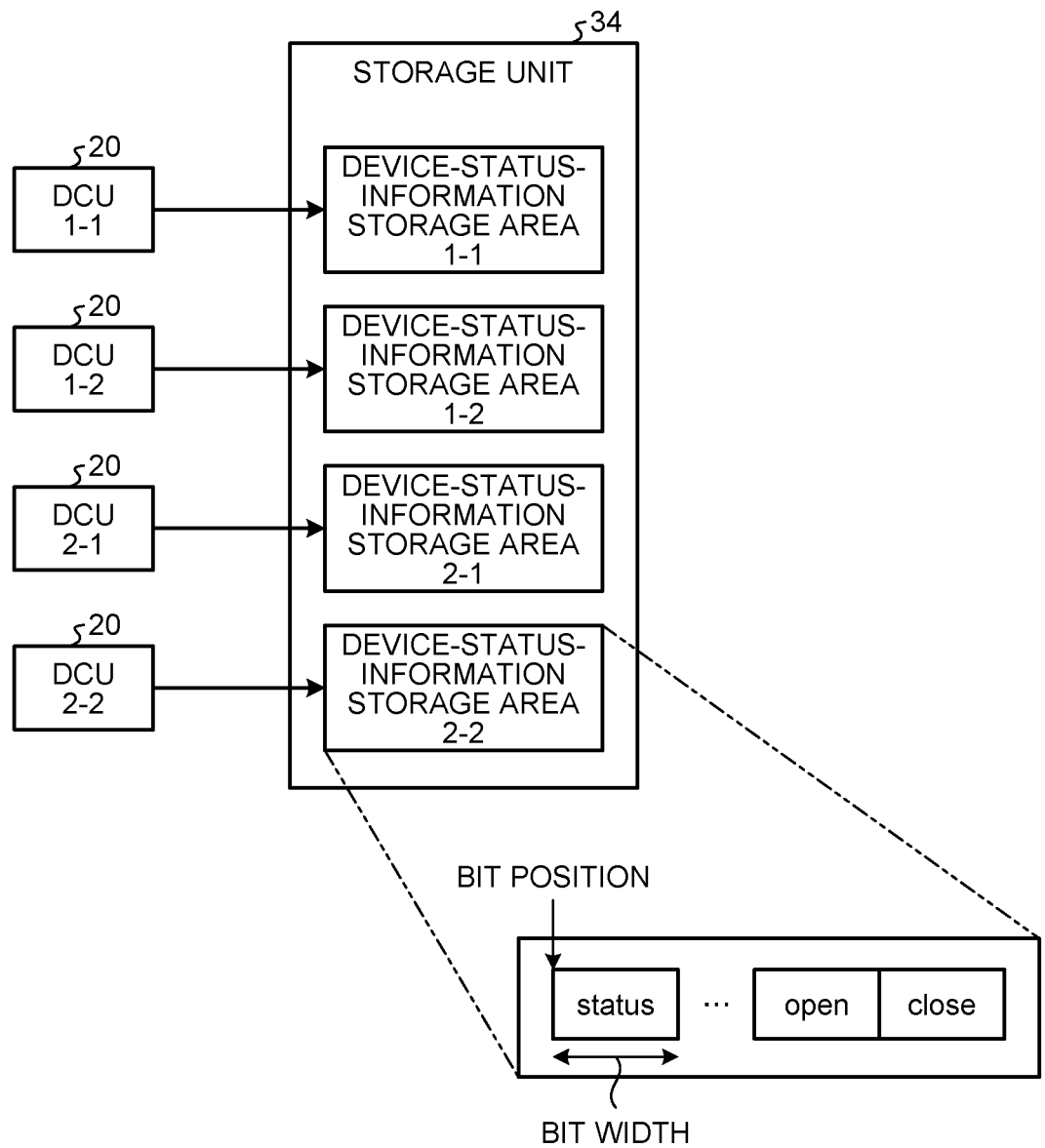
FIG. 10 is a diagram illustrating an example of area storage information in the event detection definition generated by the generation unit in the generation device by using the device location definition, the vehicle configuration definition, and the detection definition template.
FIG. 11 is a diagram illustrating an example of an area, where device status information is stored, in a storage unit included in the train monitoring device.

In contrast to the event detection definition 404 in the form of the intermediate language representation 405 illustrated as an example in FIG. 8, such a simple conditional expression as indicated by the event number 1 is achieved by inputting location information and determination item data to the arithmetic module implemented by using a native code for a CPU (Central Processing Unit) that implements a monitoring unit included in the train monitoring device 30. FIG. 9 is a diagram illustrating an example of the intermediate language representation 405 in the event detection definition 404 generated by the generation unit 102 in the generation device 100 according to the present embodiment by using the device location definition 201, the vehicle configuration definition 202, and the detection definition template 203. FIG. 10 is a diagram illustrating an example of the area storage information 406 in the event detection definition 404 generated by the generation unit 102 in the generation device 100 according to the present embodiment by using the device location definition 201, the vehicle configuration definition 202, and the detection definition template 203. As illustrated in FIG. 9, the generation unit 102 generates a portion of the event detection definition 404 indicated by the event number 2 and the event number 3 as the intermediate language representation 405. As illustrated in FIG. 10, the generation unit 102 generates a portion of the event detection definition 404 indicated by the event number 1 as the area storage information 406. In FIG. 10, "DEVICE TYPE" and "EVENT NUMBER" are obtained from the detection definition template 203. FIG. 10 illustrates an example of the area storage information 406. It is allowable that the area storage information 406 includes an item of information obtained from the details of the conditional expression indicated by the event number 1 in the detection definition template 203, for example, an item "LOGICAL INFORMATION" that represents whether the event is positive logic or negative logic, or an item "CONDITIONAL EXPRESSION". "BIT POSITION" and "BIT WIDTH" indicates information on a storage area for device status information in a memory that implements a storage unit included in the train monitoring device 30.

FIG. 11 is a diagram illustrating an example of the area, where device status information is stored, in a storage unit 34 included in the train monitoring device 30 according to the present embodiment. The train monitoring device 30 obtains device status information from the device 20 that is DCUs 1-1, 1-2, 2-1, and 2-2 through the communication network 50, and stores the obtained device status information in predetermined storage areas in the storage unit 34. In an example in FIG. 11, the train monitoring device 30 stores device status information obtained from the DCU 1-1 in a device-status-information storage area 1-1 in the storage unit 34, stores device status information obtained from the DCU 1-2 in a device-status-information storage area 1-2 in the storage unit 34, stores device status information obtained from the DCU 2-1 in a device-status-information storage area 2-1 in the storage unit 34, and stores device status information obtained from the DCU 2-2 in a device-status-information storage area 2-2 in the storage unit 34. The train monitoring device 30 stores the device status information on the devices 20 of the same type with the same layout in the storage unit 34. The storage unit 34 stores the same attribute value of the devices 20 of the same type at the same position from the leading end of the area for each individual device. Due to this storage, a determination item for the attribute value of the device 20 can be shared among the devices 20 of the same type, and can be represented by a single item definition as illustrated in the example in FIG. 10.

In a case where the train monitoring device 30 monitors the status of each device 20 installed in the train 10, most of the detection conditions are simple detection conditions. For this reason, in the generation unit 102, most of the event detections defined by the detection definition template 203 are translated into the area storage information 406, and only the remaining complex event detection definitions are translated into the intermediate language representation 405.

The generation unit 102 configured to generate the event detection definition 404 generates the event detection definition 404 in the form of the area storage information 406 for an event detection that can be represented by only area information and storage information. After having generated the program description 402, the generation unit 102 translates the program description 402 for an event detection, which cannot be processed by the area information and the storage information, into the intermediate language representation 405 by using the program language tool 403.

As illustrated in FIG. 7, the generation unit 102 generates the program description 402 for a portion of the detection definition template 203 indicated by the event number 2 and the event number 3, and translates the program description 402 into the form of the intermediate language representation 405 by using the program language tool 403. The generation unit 102 generates the area storage information 406 for a portion of the detection definition template 203 indicated by the event number 1, as illustrated in FIG. 10.

Figure 12:
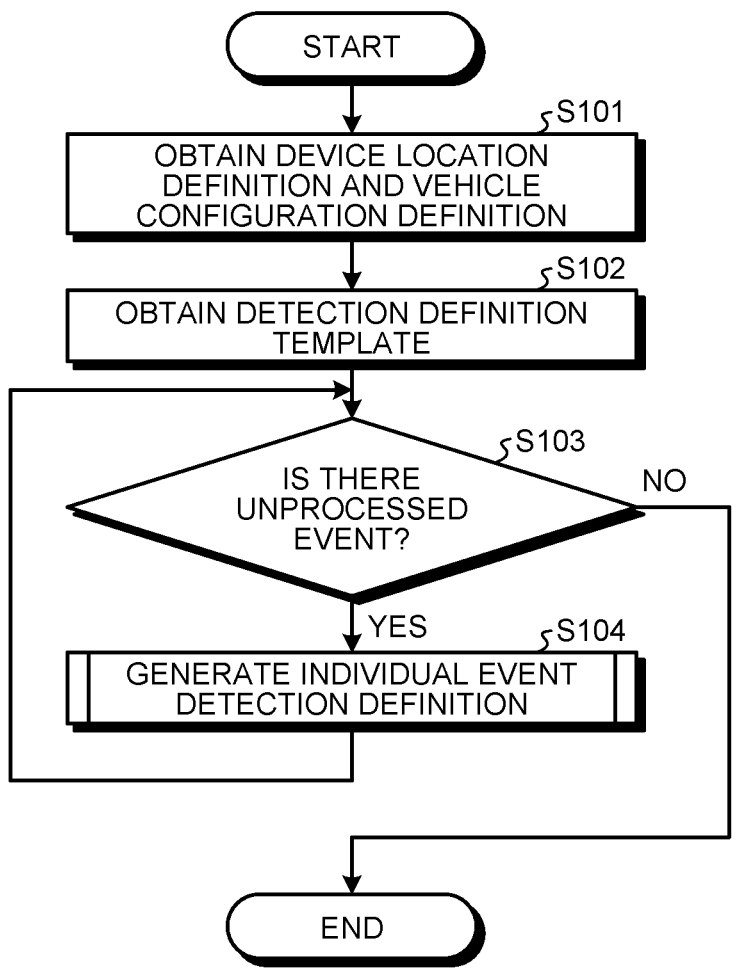
FIG. 12 is a flowchart illustrating a process of generating an event detection definition by the generation unit in the generation device.

FIG. 12 is a flowchart illustrating the process of generating the event detection definition 404 by the generation unit 102 in the generation device 100 according to the present embodiment. The generation unit 102 obtains the device location definition 201 and the vehicle configuration definition 202 through the obtaining unit 101 (Step S101). The generation unit 102 also obtains the detection definition template 203 through the obtaining unit 101 (Step S102). The generation unit 102 checks whether an event described in the detection definition template 203 has not undergone a process of generating an individual event detection definition, that is, whether there is an unprocessed event (Step S103). The individual event detection definition refers to data obtained by the generation unit 102 by performing a generation process in the generation program 401 on a single event defined in the detection definition template 203 by using the device location definition 201, the vehicle configuration definition 202, and the detection definition template 203. The event detection definition 404 made up of individual event detection definitions is generated in the form of the intermediate language representation 405 or in the form of the area storage information 406 as described above. When there is an unprocessed event (YES at Step S103), the generation unit 102 generates an individual event detection definition by using the unprocessed event (Step S104). After the process at Step S104, the generation unit 102 returns to the process at Step S103. When there is not an unprocessed event (NO at Step S103), the generation unit 102 ends the process of generating the event detection definition 404.

Figure 13:
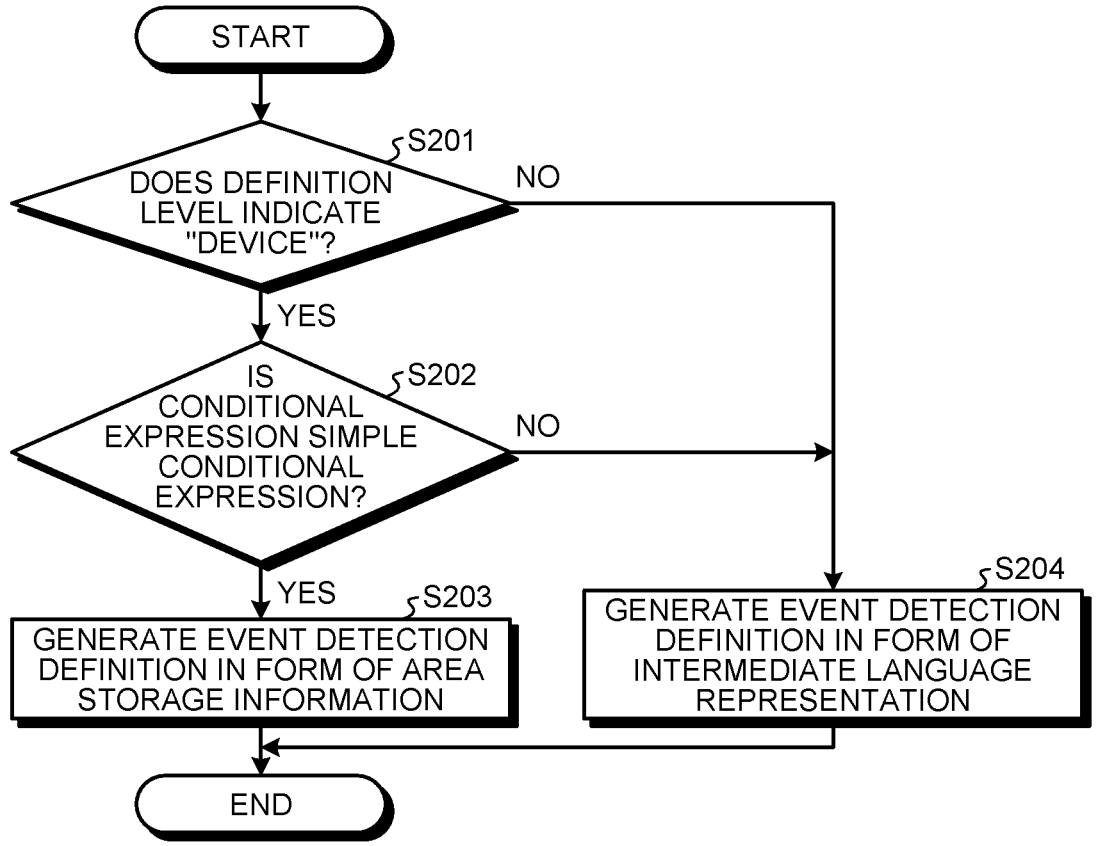
FIG. 13 is a flowchart illustrating a process of generating an individual event detection definition by the generation unit in the generation device.

FIG. 13 is a flowchart illustrating the process of generating an individual event detection definition by the generation unit 102 in the generation device 100 according to the present embodiment. The flowchart illustrated in FIG. 13 illustrates the details of the process at Step S104 in the flowchart illustrated in FIG. 12. The generation unit 102 checks whether the definition level of the unprocessed event indicates "device" (Step S201). When the definition level of the unprocessed event indicates "device" (YES at Step S201), the generation unit 102 checks whether a conditional expression of the unprocessed event obtained from the detection definition template 203 is a simple conditional expression, that is, a monomial (Step S202). It is allowable that the generation unit 102 additionally performs a process of expanding the conditional expression during the determination to check whether the conditional expression is a monomial.

When the conditional expression of the unprocessed event is a simple conditional expression (YES at Step S202), the generation unit 102 generates the event detection definition 404 of this unprocessed event in a form to be executed by the second program 303, that is, in the form of the area storage information 406 (Step S203). When the conditional expression of the unprocessed event is not a simple conditional expression (NO at Step S202), the generation unit 102 generates the event detection definition 404 of this unprocessed event in a form to be executed by the first program 302, that is, in the form of the intermediate language representation 405 (Step S204). In this manner, the generation unit 102 generates the event detection definition 404 in the form of the area storage information 406 for a conditional expression made up of a monomial in the detection definition template 203, while generating the event detection definition 404 in the form of the intermediate language representation 405 for a condition that is not applicable to the condition for generating the event detection definition 404.

When the definition level of the unprocessed event does not indicate "device", that is, when the definition level of the unprocessed event indicates "vehicle" or "formation" (NO at Step S201), the generation unit 102 generates the event detection definition 404 of this unprocessed event in a form to be executed by the first program 302, that is, in the form of the intermediate language representation 405 (Step S204). In this manner, when the condition for the device 20 is defined in units of the train 10 or a vehicle constituting the train 10 in the detection definition template 203, the generation unit 102 generates the event detection definition 404 in the form of the intermediate language representation 405 for the condition defined in units of the train 10 or the vehicle.

In this manner, the generation unit 102 determines whether to generate the event detection definition 404 of each individual event described in the detection definition template 203 either in the form of the intermediate language representation 405 or in the form of the area storage information 406. The event detection definition 404 generated by the generation unit 102 includes the intermediate language representation 405 that is processable for the first program 302 included in the event detection program 301. The event detection definition 404 generated by the generation unit 102 includes the area storage information 406 that is interpretable for the second program 303 included in the event detection program 301. The area storage information 406 is area information and storage information on a memory having stored therein a value that indicates whether an event has occurred.

Figure 14:
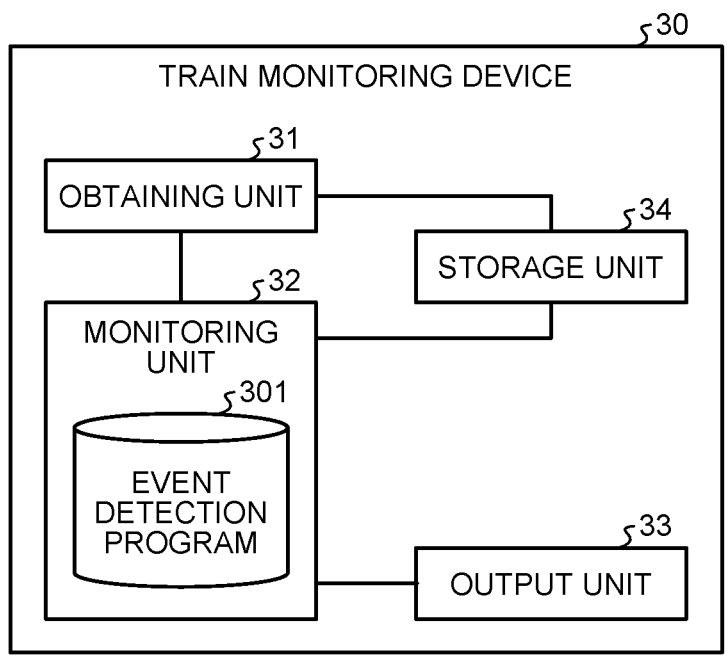
FIG. 14 is a block diagram illustrating a configuration example of the train monitoring device.

Next, descriptions are made on the configuration of the train monitoring device 30 that monitors the status of the device 20 installed in the train 10 by using the event detection definition 404 generated by the generation unit 102. FIG. 14 is a block diagram illustrating a configuration example of the train monitoring device 30 according to the present embodiment. The train monitoring device 30 includes an obtaining unit 31, a monitoring unit 32, an output unit 33, and the storage unit 34.

The obtaining unit 31 obtains, from the device 20, device status information indicating the status of the device 20. The obtaining unit 31 stores the obtained device status information in a predetermined area of the storage unit 34.

The monitoring unit 32 is implemented by the event detection program 301 loading and executing data in the event detection definition 404. The monitoring unit 32 monitors the status of the device 20 on the basis of the device status information. Specifically, in the monitoring unit 32, the first program 302 executes the intermediate language representation 405 included in the event detection definition 404, and the second program 303 executes the area storage information 406 included in the event detection definition 404. That is, the monitoring unit 32 includes the event detection definition 404, and the event detection program 301 to interpret the event detection definition 404 and check whether an event has occurred. In the monitoring unit 32, when the event detection program 301 monitors the status of a device on the basis of device status information, the first program 302 included in the event detection program 301 interprets and executes the intermediate language representation 405 included in the event detection definition 404. The second program 303 included in the event detection program 301 determines whether an event has occurred by using the area storage information 406 included in the event detection definition 404. The area storage information 406 is area information and storage information about a memory having stored therein a value that indicates whether an event has occurred.

When the monitoring unit 32 detects an anomaly in the device 20, the output unit 33 outputs an alarm indicating that this device 20 is in an anomalous status to the display device 40. It is allowable that the output unit 33 outputs a monitoring result in the monitoring unit 32 and an alarm to a recording device (not illustrated). Due to this output, the train 10 can hold therein the alarm indicating an anomaly detected by the train monitoring device 30, and a history of the monitoring result in the train monitoring device 30.

The obtaining unit 31 stores the obtained device status information in the storage unit 34 in an area predetermined individually for the device status information. Due to this storage, the monitoring unit 32 can monitor the status of the device 20 by referring to the device status information stored in the predetermined area of the storage unit 34.

Next, a hardware configuration of the generation device 100 is described. In the generation device 100, the obtaining unit 101 is an input interface capable of receiving the device location definition 201, the vehicle configuration definition 202, and the detection definition template 203. The generation unit 102 is implemented by a processing circuitry. It is allowable that the processing circuitry is either dedicated hardware, or a memory and a processor that executes programs stored in the memory.

Figure 15:
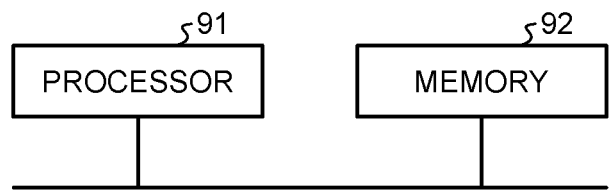
FIG. 15 is a diagram illustrating an example of a processing circuitry included in the generation device in a case where the processing circuitry is configured by a processor and a memory.

FIG. 15 is a diagram illustrating an example of the processing circuitry included in the generation device 100 according to the present embodiment in a case where the processing circuitry is configured by a processor and a memory. In a case where the processing circuitry is configured by a processor 91 and a memory 92, the functions of the processing circuitry of the generation device 100 are implemented in software, firmware, or a combination of the software and the firmware. The software or the firmware is described as a program and stored in the memory 92. In the processing circuitry, the processor 91 reads and executes the program stored in the memory 92 to thereby implement each of the functions. That is, the processing circuitry includes the memory 92 that stores therein programs that eventually execute the processing of the generation device 100. These programs are also regarded as causing a computer to execute the procedure and the method of the generation device 100.

The processor 91 may be a device such as a CPU, a processing device, an arithmetic device, a microprocessor, a microcomputer, or a DSP (Digital Signal Processor). A nonvolatile or volatile semiconductor memory such as a RAM (Random Access Memory), a ROM (Read Only Memory), a flash memory, an EPROM (Erasable Programmable ROM), and an EEPROM® (Electrically EPROM), or a device such as a magnetic disk, a flexible disk, an optical disk, a compact disk, a MiniDisk, or a DVD (Digital Versatile Disc) corresponds to the memory 92, for example.

The event detection program 301 is designed to read the event detection definition 404 so as to perform an event detection process. However, it is allowable that the generation program 401 generates the program description 402 and the area storage information 406 itself as a source program description of the event detection program 301, and the event detection program 301 translates the generated program description into a native code for a CPU to operate. In this case, although the advantage of solely replacing data to make a change in the detection specifications is lost, the step of interpreting and executing an intermediate language representation can be omitted, so that execution performance in the detection process improves.

Next, a hardware configuration of the train monitoring device 30 is described. In the train monitoring device 30, the obtaining unit 31 is an input interface capable of receiving device status information. The output unit 33 is an output interface to output an alarm and a monitoring result. The storage unit 34 is implemented by a memory. The monitoring unit 32 is implemented by a processing circuitry. It is allowable that the processing circuitry is configured by a processor and a memory as illustrated in FIG. 15, similarly to that in the generation device 100.

As described above, according to the present embodiment, the train monitoring device 30 interprets and executes the event detection definition 404 generated by the generation device 100 by using the device location definition 201, the vehicle configuration definition 202, and the detection definition template 203. When a change is made in the vehicle configuration, the train configuration, and the event detection specifications, then corresponding to the change, the train monitoring device 30 makes a change in the device location definition 201, the vehicle configuration definition 202, and the detection definition template 203. When a certain train monitoring device 30 is created, the device location definition 201, the vehicle configuration definition 202, and the detection definition template 203 are prepared corresponding to the certain train monitoring device 30. This does not involve making a change in the event detection program 301, and therefore reduces the amount of work required.

When the train monitoring device 30 monitors the status of the device 20 on the basis of device status information, the first program 302 included in the event detection program 301 interprets and executes the intermediate language representation 405, and the second program 303 included in the event detection program 301 interprets and executes the area storage information 406.

In general, the intermediate language representation 405 has a complex structure since the intermediate language representation 405 is designed to handle various types of data including program descriptions of repetitive processing, branch processing, and other processing, as well as integers, real numbers, and character strings. When a process of interpreting and executing the intermediate language representation 405 is compared to a process of acquiring a stored integer value by only using the area storage information 406 that is area information and storage information, the intermediate language representation 405 can represent a complex process, although the intermediate language representation 405 becomes a more complex program. A considerable amount of time and effort is required to execute such a complex program. Thus, execution performance of a monitoring device is degraded. In the present embodiment, most of event definitions can be represented in the form of the area storage information 406. While the intermediate language representation 405 is used for some complex process definitions, most of the definitions are handled in the form of the area storage information 406 and thus can be implemented by a simple process. This can save time and effort required for the execution. When a change has been made in the device location and the vehicle configuration in the train 10, and in the event detection definitions, then corresponding to the change, the train monitoring device 30 that monitors the status of the device 20 only needs to make a change in the device location definition 201, the vehicle configuration definition 202, and the detection definition template 203 without the need for making a change in the event detection program 301 incorporated in the train monitoring device 30. Therefore, the train monitoring device 30 makes it possible to reduce the amount of work required for maintenance for a change in the device location and the vehicle configuration in the train 10 and for a change in the event detection definitions. This results in improvement in the maintainability of the train monitoring device 30. The train monitoring device 30 can also minimize a reduction in the processing speed by handling most of the definitions in the form of the area storage information 406.

The configurations described in the above embodiments are only examples of the content of the present invention. The configurations can be combined with other well-known techniques, and part of each of the configurations can be omitted or modified without departing from the scope of the present invention.

REFERENCE SIGNS LIST 10 train, 20a to 20n device, 30 train monitoring device, 31, 101 obtaining unit, 32 monitoring unit, 33 output unit, 34 storage unit, 40 display device, 50 communication network, 100 generation device, 102 generation unit, 201 device location definition, 202 vehicle configuration definition, 203 detection definition template, 301 event detection program, 302 first program, 303 second program, 401 generation program, 402 program description, 403 program language tool, 404 event detection definition, 405 intermediate language representation, 406 area storage information.

The invention claimed is:

1. A train monitoring device that monitors a status of a device installed in a train, the train monitoring device comprising:
   obtaining circuitry to obtain, from the device, device status information indicating a status of a device and device location information indicating a location of the device in the train, and obtain from the train, a vehicle configuration definition defining a formation of the train;
   generating circuitry to generate an event detection definition which includes data for determining whether the device is in an anomalous status, the event detection definition being generated based on at least the device status information, the device location information, and the vehicle configuration definition, the event detection definition including an intermediate language representation;
   monitoring circuitry including an event detection definition, and an event detection program to interpret the event detection definition and check whether one of plural event types has occurred,
   the train monitoring circuitry executing the event detection program to monitor a status of the device on a basis of the event detection definition, a first program included in the event detection program is executed for a first event condition, the first program being executed based on the intermediate language representation of the event detection definition, and a second program included in the event detection program is executed for a second event condition, the second program evaluating at least area information and storage information included in the event detection definition; and output circuitry to output an alarm indicating that the device is an anomalous status including the associated event type when the monitoring circuitry detects an anomaly of the associated event type in the device based on execution of the first or second program.

2. The train monitoring device according to claim 1, comprising storage circuitry to store the device status information in an area predetermined individually for the device status information, wherein the monitoring circuitry monitors a status of the device by referring to the device status information stored in the storage circuitry.

3. A generation device that generates an event detection definition to be used in an event detection program to be executed by a train monitoring device that monitors a status of a device installed in a train, the generation device comprising:

obtaining circuitry to obtain a device location definition in which a location of the device in the train is defined, a vehicle configuration definition in which formation of the train is defined, and a detection definition template condition indicating that the device is in an anomalous status is defined, the detection definition template having plural event types, and each event type having monitoring details for detecting an anomaly; and generation circuitry to generate the event detection definition by using the device location definition, the vehicle configuration definition, and the detection definition template, wherein the event detection definition includes:

a first program generating one or more device check operations based on an interpretation an intermediate language representation generated from the device location definition, the vehicle configuration definition, and the detection definition template, and a second program for reading area information and storage information on a memory having stored therein a value that indicates whether an event has occurred, the intermediate language representation and the area information and storage information being generated based on whether a device monitoring event returns a first condition or a second condition as specified in the detection definition template.

4. The generation device according to claim 3, wherein the generation circuitry generates the event detection definition in a form of the area information and the storage information on the memory for a monomial condition as specified in the detection definition template, and generates the event detection definition in a form of the intermediate language representation for a condition that is not applicable to the monomial condition for generating the event detection definition in a form of the area information and the storage information on the memory.

5. The generation device according to claim 3, wherein when the condition for the device is defined in units of the train or a vehicle constituting the train in the detection definition template, the generation circuitry generates the event detection definition in a form of the intermediate language representation for the condition defined in units of the train or the vehicle.

6. An event detection definition generation method for a generation device that generates an event detection definition to be used in an event detection program to be executed by a train monitoring device that monitors a status of a device installed in a train, the event detection definition generation method comprising:

obtaining, by obtaining circuitry, a device location definition in which a location of the device in the train is defined, a vehicle configuration definition in which formation of the train is defined, and a detection definition template in which a condition indicating that the device is in an anomalous status is defined, the detection definition template having plural event types, and each event type having monitoring details for detecting an anomaly; and generating, by generation circuitry, the event detection definition using the device location definition, the vehicle configuration definition, and the detection definition template, wherein the event detection definition includes:

a first program generating one or more device check operations based on an interpretation an intermediate language representation generated from the device location definition, the vehicle configuration definition, and the detection definition template, and a second program for reading area information and storage information on a memory having stored therein a value that indicates whether an event has occurred, the intermediate language representation and the area information and storage information being generated based on whether a device monitoring event returns a first condition or a second condition as specified in the detection definition template.

7. The event detection definition generation method according to claim 6, wherein in generating the event detection definition, the generation circuitry generates the event detection definition in a form of the area information and storage information on the memory for a monomial condition in the detection definition template, and generates the event detection definition in a form of the intermediate language representation for a condition that is not applicable to the monomial condition for generating the event detection definition in a form of the area information and the storage information on the memory.

8. The event detection definition generation method according to claim 6, wherein in generating the event detection definition, when the condition for the device is defined in units of the train or a vehicle constituting the train in the detection definition template, the generation circuitry generates the event detection definition in a form of the intermediate language representation for the condition defined in units of the train or the vehicle.

* * * * *